(12) United States Patent
An et al.

(10) Patent No.: US 11,204,280 B2
(45) Date of Patent: Dec. 21, 2021

(54) METHOD OF PHASE QUALITY CONTROL FOR GLASS CERAMICS IN MANUFACTURING

(71) Applicant: CORNING INCORPORATED, Corning, NY (US)

(72) Inventors: Chong Pyung An, Painted Post, NY (US); Ryan Claude Andrews, Elmira, NY (US); Galan Gregory Moore, Henrietta, NY (US); Rohit Rai, Painted Post, NY (US); Erika Lynn Stapleton, Lindley, NY (US); Ljerka Ukrainczyk, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/804,219

(22) Filed: Feb. 28, 2020

(65) Prior Publication Data

US 2020/0278254 A1 Sep. 3, 2020

Related U.S. Application Data

(60) Provisional application No. 62/812,721, filed on Mar. 1, 2019.

(51) Int. Cl.
*G01J 3/44* (2006.01)
*G01N 21/47* (2006.01)
*G01J 3/28* (2006.01)

(52) U.S. Cl.
CPC ............ *G01J 3/44* (2013.01); *G01N 21/4788* (2013.01); *G01J 2003/2863* (2013.01); *G01J 2003/2873* (2013.01); *G01J 2003/2879* (2013.01)

(58) Field of Classification Search
None
See application file for complete search history.

(56) References Cited

U.S. PATENT DOCUMENTS 4,871,384 A * 10/1989 Kasuga .................. A61L 27/12
65/30.1
6,313,423 B1 * 11/2001 Sommer ................ B07C 5/366
209/587

(Continued)

FOREIGN PATENT DOCUMENTS

DE 102012203717 A1 * 3/2013 ........... G01N 33/388
DE 102012203717 A1 3/2013

(Continued)

OTHER PUBLICATIONS

Google translation of DE-102012203717-A1.*

(Continued)

*Primary Examiner* — Shawn Decenzo
(74) *Attorney, Agent, or Firm* — John P. McGroarty

(57) ABSTRACT

A method for determining crystal phases of a glass ceramic sample, including the steps of applying energy to the sample using an excitation source, detecting raw Raman spectral energy that is given off by the sample using a detector, wherein the raw Raman spectral energy includes peak values, determining a plurality of predetermined energy peaks based off a composition of the sample, superimposing the plurality of predetermined energy peaks over the raw Raman spectral energy, applying a baseline value between each predetermined energy peak, subtracting the baseline value from the raw Raman spectral energy, calculating corrected peak values based on the raw Raman spectral energy and baseline value, and determining the crystal phases of the glass ceramic sample based on the corrected peak values.

4 Claims, 8 Drawing Sheets

(56) References Cited

U.S. PATENT DOCUMENTS

| | | | |
|---|---|---|---|
| 9,051,201 B2 | 6/2015 | Aburatani et al. | |
| 9,783,445 B1 | 10/2017 | Cole et al. | |
| 9,991,554 B2 | 6/2018 | Aburatani et al. | |
| 2007/0136014 A1* | 6/2007 | Neiss | G01N 21/65 |
| | | | 702/76 |
| 2009/0200508 A1* | 8/2009 | Nagase | C01G 53/50 |
| | | | 252/182.1 |
| 2018/0009694 A1* | 1/2018 | Cole | G01N 21/65 |

FOREIGN PATENT DOCUMENTS

| | | | |
|---|---|---|---|
| JP | 2006015582 A | 1/2006 | |
| JP | 2018171620 A | 11/2018 | |

OTHER PUBLICATIONS

Adar et al; "Raman Spectroscopy for Process/Quality Control"; Applied Spectroscopy Reviews, 32 (1&2), 45-100 (1997.

Graca et al; "Structural and Optical Spectroscopy Of LiNbO3: Tm Nanocrystals Embedded in a SiO2 Glass Matrix"; Journal of Non-Crystalline Solids; 354 (2008) 5244-5246.

International Search Report and Written Opinion of the International Searching Authority; PCT/US2020/019638; dated Jun. 4, 2020; 19 Pages; European Patent Office.

Kim et al; "Quantitative Phase Analysis in Tetragonal-Rich Tetragonal/Monoclinic Two Phase Zirconia By Raman Spectroscopy"; Journal of Materials Science Letters; 16 (1997) pp. 669-671.

Marshall et al; "Crack-Tip Transformation Zones in Toughened Xirconia"; J. Am. Ceram. Soc., 73 [9]; pp. 2659-2666 (1990.

Singh et al; "Structure Composition Correlation in KNN-BT Ceramics—An X-Ray Diffraction and Raman Spectroscopic Investigation"; Materials Chemistry and Physics; 138 (2013) pp. 905-908.

Veirs et al; "Mapping Materials Properties With Raman Spectroscopy Utilizing a 2-D Detector"; Applied Optics; vol. 29, No. 33; (1990) pp. 4969-4980.

* cited by examiner

Lithium Silicate peak:
# of data points: ~20 points w/ 1.5cm$^{-1}$ resolution, ~6points w/ 4.5 cm$^{-1}$ Mixed petalite & LS2 Peak:
# of data points: ~30 points w/ 1.5cm$^{-1}$ resolution, ~12 points w/ 4.5 cm$^{-1}$

METHOD OF PHASE QUALITY CONTROL FOR GLASS CERAMICS IN MANUFACTURING

This application claims the benefit of priority under 35 U.S.C. § 119 of U.S. Provisional Application Ser. No. 62/812,721 filed Mar. 1, 2019, the content of which is relied upon and incorporated herein by reference in its entirety.

TECHNICAL FIELD

The present specification generally relates to a method for determining crystal phases of a glass ceramic sample and, more specifically, to a method for determining crystal phases of a glass ceramic sample using Raman spectroscopy.

BACKGROUND

It has been known to utilize x-ray diffraction (XRD) as the standard technique to verify crystal phase assemblage of glass ceramics. However, XRD is not a technique that is optimal for quality control in manufacturing because of high cost of instruments, long analysis time, potential false positives for crystal phases, and the complexity of safety monitoring required for x-ray radiation.

SUMMARY

In manufacturing of glass ceramic sheets or 3D shapes for consumer electronics applications, it is desirable to have tight control of glass ceramic phases and to avoid undesirable phases that could impact chemical strengthening properties, mechanical properties, chemical durability, color, or haze for transparent glass ceramics. For 3D glass ceramics, it is also desirable to verify crystal phase assemblage after nucleation and then again after the ceram is completed in the 3D forming process. Usually the thermal process window is about +/−10 C, and these temperature variations in the manufacturing process can result in undesirable haze.

The methods according to embodiments use Raman spectroscopy to facilitate quality control in glass ceramics during the manufacturing process. Quantification of Raman peak analysis as calibrated by XRD can be used to confirm the phase assemblage of glass ceramics. The result can be displayed as a % phase, or as a pass/fail for quality control purposes. The method can be used to aid with quality control in full ceram processes, nucleation only processes, and 3D forming processes that include a ceram cycle.

Raman spectroscopy has certain advantages over XRD spectroscopy. These advantages include a lower radiation exposure, lower instrument cost, lower quality control measurement time (such as, 1-2 minutes per sample reading), simplified equipment operation, less sensitivity to the sample geometry and placement, less artifacts, simplified artifact analysis, and a higher resolution of phases if glass content (% of total weight) is high in the sample.

In one embodiment, a method for determining crystal phases of a glass ceramic sample includes the steps of applying energy to the sample using an excitation source, detecting raw Raman spectral energy that is given off by the sample using a detector, wherein the raw Raman spectral energy includes peak values, determining a plurality of predetermined energy peaks based off a composition of the sample, superimposing the plurality of predetermined energy peaks over the raw Raman spectral energy, applying a baseline value between each predetermined energy peak, subtracting the baseline value from the raw Raman spectral energy, calculating corrected peak values based on the raw Raman spectral energy and baseline value, and determining the crystal phases of the glass ceramic sample based on the corrected peak values.

In another embodiment, a method for crystal phase quality control of nucleated or partially cerammed glass sheet, wherein the partially cerammed sheet has crystal phases that make it suitable for further processing in 3D forming or sheet bending.

In another embodiment, a method for crystal phase quality control of a 3D glass ceramic article that is cerammed while being 3D formed from either green glass or from a nucleated sheet.

In another embodiment, a method of evaluating glass ceramic/partially cerammed/nucleated articles based on Raman characterization in accordance with claim 1, including rejecting a sample if a ratio of a peak area for an undesirable phase and selected desirable phase(s) is calculated to be outside a plurality of acceptable limits, and rejecting the sample if relative amounts of each phase, determined based on calibration curve between XRD and Raman, are calculated to be outside a plurality of acceptable limits.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Methods for determining crystal phases of a glass ceramic sample prior to, during, and after a heat treatment process according to embodiments will now be described. Energy is applied to the sample using an excitation source, such as a laser beam, in order to excite the electrons within the sample so that the electrons give off Raman and Rayleigh energy. As the energy from the sample propagates through the measuring apparatus, the Rayleigh energy can be filtered out. The raw Raman spectral energy that is given off by the sample is measured using a photodetector or spectrometer. The raw Raman spectral energy includes peak values which correspond to the types of crystal phases present in the sample. In order to use Raman spectroscopy, XRD spectroscopy is used to calibrate the apparatus for a type of sample, where a plurality of predetermined energy peaks is based off the XRD spectroscopy analysis of a composition of the sample. Once the predetermined energy peaks and corresponding wavenumbers are determined by XRD spectroscopy, the plurality of predetermined energy peaks is superimposed over the raw Raman spectral energy. A baseline value is arranged between each predetermined energy peak, with the baseline value being subtracted from the raw Raman spectral energy. From this data, corrected peak values based on the raw Raman spectral energy and baseline value can be calculated, and these corrected peaks can be used to determine the crystal phases of the glass ceramic sample based on the corrected peak values.

Various embodiments of methods and apparatuses for determining the crystal phases of a glass ceramic sample will now be described herein with specific reference to the appended drawings.

Figure 1A:
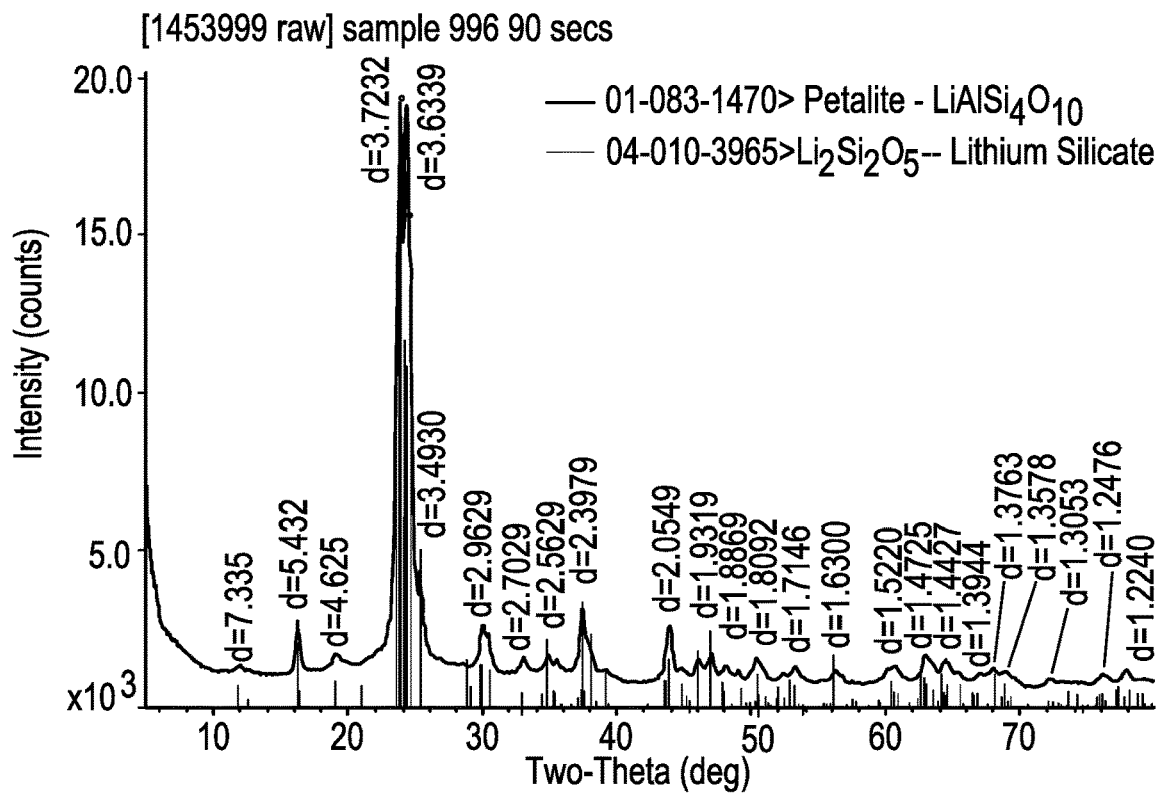
FIG. 1A depicts an XRD spectral analysis for a glass ceramic sample without an undesired phase.

FIG. 1A depicts an example XRD spectral analysis of a glass ceramic sample containing lithium disilicate (43% total weight), petalite (42% total weight), and glass (15% total weight). For this specific sample, a grouping of lithium metasilicate in an amount larger than about 4% of the total sample weight may be an undesirable phase in this system. The sample, which is represented by the XRD spectral analysis of FIG. 1A, contains a minimal/negligible amount of lithium metasilicate, if any.

Figure 1B:
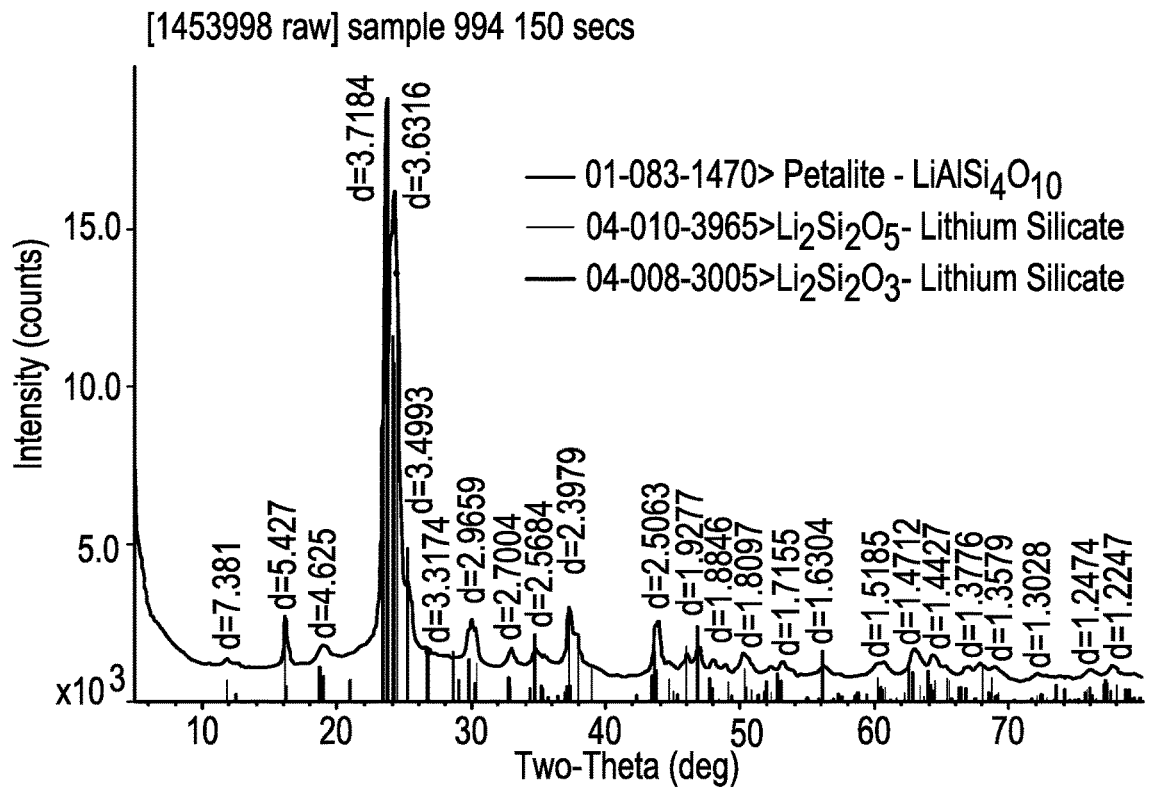
FIG. 1B depicts an XRD spectral analysis for a glass ceramic sample with an undesired phase.

FIG. 1B depicts an example XRD spectral analysis of a glass ceramic sample containing lithium disilicate (41% total weight), petalite (43% total weight), lithium metasilicate (2% total weight), and glass (14% total weight). As shown in the figure, there is significant peak overlap between all phases, and only one peak for lithium metasilicate that does not overlap, indicated by arrow A. Because of the significant peak overlap between the phases, analysis with XRD is challenging and requires an expert to interpret the data to avoid false positives.

Figure 2A:
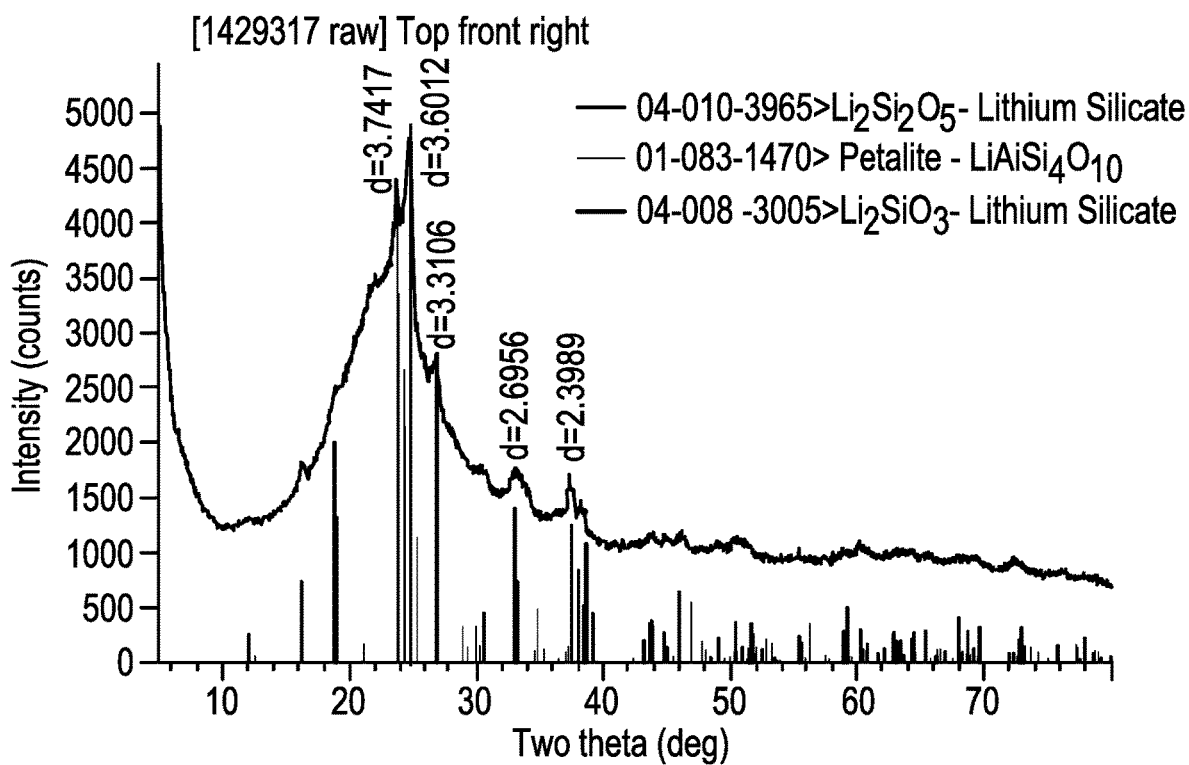
FIG. 2A depicts an XRD spectral analysis for a glass ceramic sample having only nucleated material.

FIG. 2A depicts an example XRD spectral analysis of nucleated only material containing lithium disilicate (5.2% total weight), petalite (1.2% total weight), lithium metasilicate (4.3% total weight), and glass (89% total weight). The large amount of amorphous glass contributes to peak noise within the XRD spectral analysis of the sample of FIG. 2A.

Figure 2B:
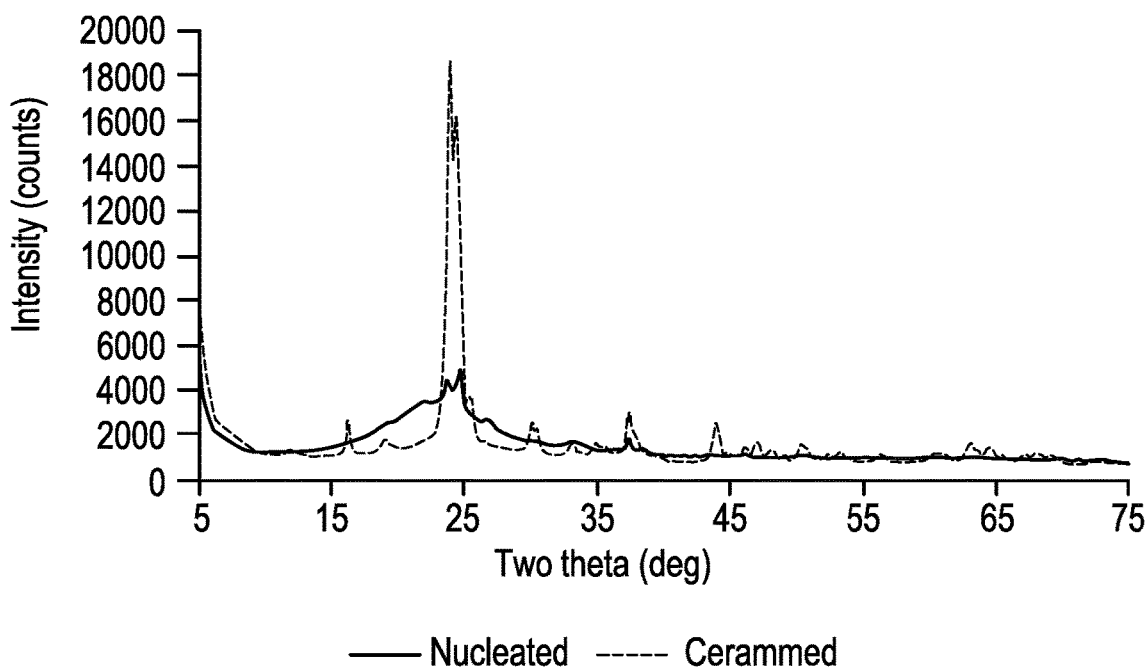
FIG. 2B depicts an XRD spectral analysis comparison between a fully cerammed and nucleated sheet for the glass ceramic sample from FIG. 1.

FIG. 2B depicts a comparison of peak intensities between a fully cerammed sample of a glass ceramic composition analyzed in FIG. 1B, with a nucleated sample of a glass ceramic composition analyzed in FIG. 1B. As shown in FIG. 2B, the low intensity of nucleated material crystal peaks make detection difficult through XRD spectral analysis because the peaks of the phases have yet to be developed at the nucleation phase, which is before ceram.

Figure 3A:
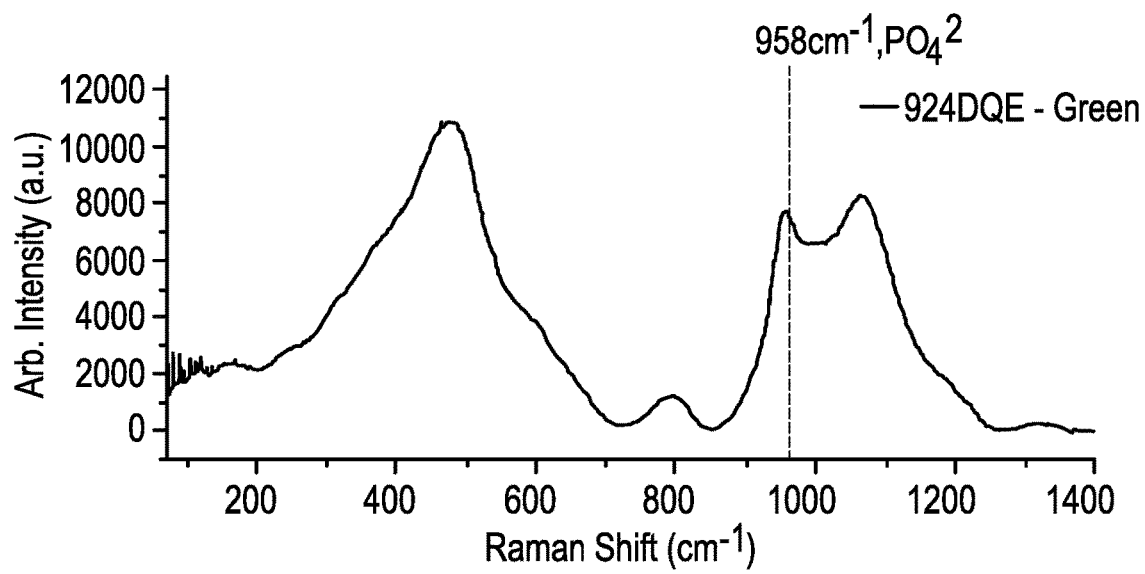
FIG. 3A depicts a Raman spectral analysis for a glass ceramic sample prior to heat treatment, according to one or more embodiments shown or described herein.

FIG. 3A depicts an example of a Raman spectral analysis of green glass (containing inactivated nucleating agents) prior to heat treatment. As used herein, "green glass" is glass that has not yet been subject to any heat treatment. As shown in the FIG. 3A, secondary phases have yet to develop within the green glass because the crystallization process has not begun.

Figure 3B:
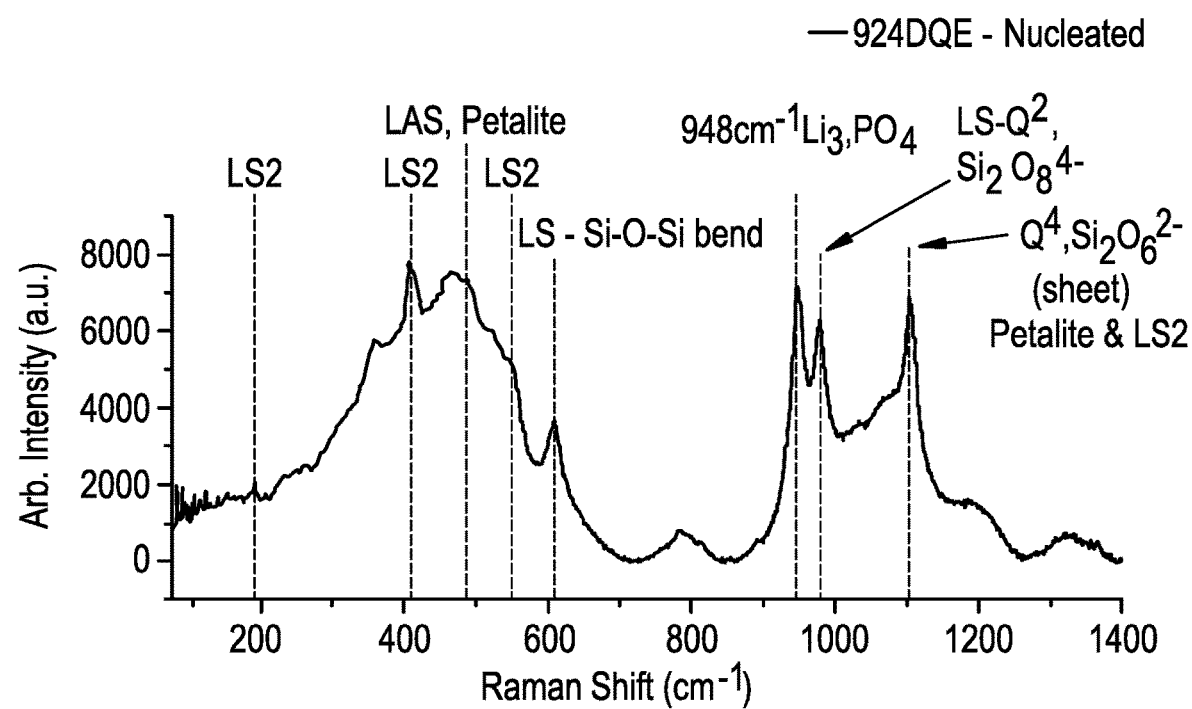
FIG. 3B depicts a Raman spectral analysis for a glass ceramic sample having only nucleated material, according to one or more embodiments shown or described herein.

FIG. 3B depicts an example of a Raman spectral analysis of nucleated only material containing lithium disilicate (5.2% total weight), petalite (1.2% total weight), lithium metasilicate (4.3% total weight), and glass (89% total weight). As shown in the FIG. 3B, the peaks corresponding to the crystal phases are well defined even at a low crystal phase %. The nucleating agents contained within the green glass (analyzed in FIG. 3A) begin the nucleation phase during a heat treatment. FIG. 3B depicts how certain phases develop in the glass in the form of peaks when analyzed with a Raman spectral analysis.

Figure 4:
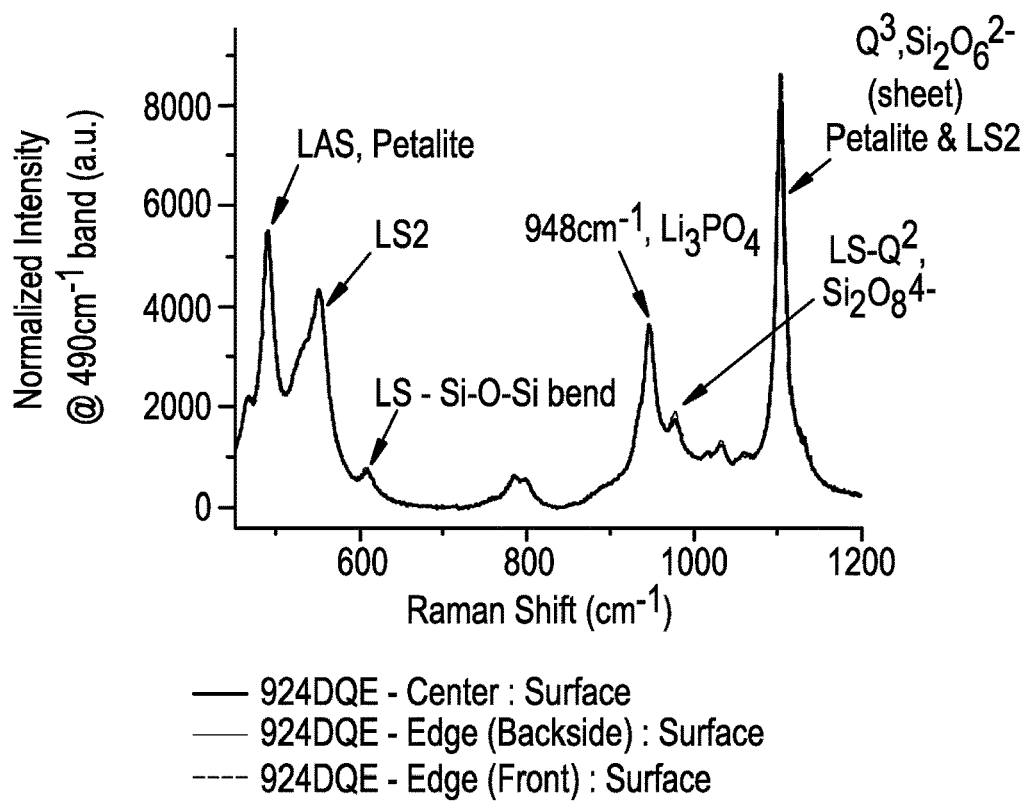
FIG. 4 depicts a Raman spectral analysis for a glass ceramic sample made from a nucleated sheet in a 3D process, according to one or more embodiments shown or described herein.

FIG. 4 depicts a Raman spectral analysis for a sample of cerammed material made from a nucleated sheet that was 3D formed/cerammed in a 3D process. The sample depicted in FIG. 4 shows a presence of trace amounts of lithium metasilicate (LS), which can be considered an undesired phases within the sample. Raman spectral analysis has a high sensitivity for detecting lithium metasilicate, which allows one to detect and address small thermal non-uniformities during the cerammming process by detecting small amounts of undesired phases within sample variations. During the cerammming process, the heat treatment activates the nucleating agents contained within the network of the glass, which allows different phases within the glass to begin forming an assemblage. After the phases begin nucleation and form, the crystal phases can begin a growing phase during the heat treatment process within the assemblage of the glass.

As shown in FIGS. 3A, 3B, and 4, a Raman spectral analysis may have very distinct peaks that can be used to identify and quantify crystal phases in glass ceramic and nucleated only materials. The lithium metasilicate (LS) peak is more clearly separated than it is in XRD spectral analysis, as shown in a comparison of FIG. 4 and FIG. 1B. The Raman spectral analysis detection method provides higher accuracy and precision in detecting a lithium metasilicate phase, which may be an undesired phase.

Figure 5A:
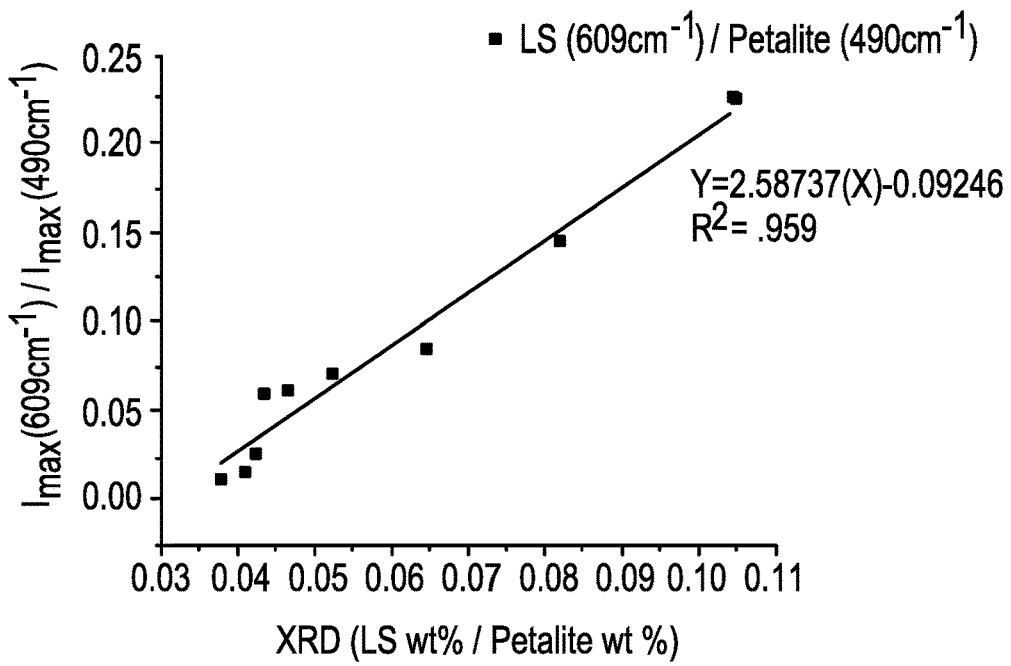
FIG. 5A depicts a calibration curve of an XRD spectral analysis using the peak intensity of a Raman spectral analysis peak, according to one or more embodiments shown or described herein.
Figure 5B:
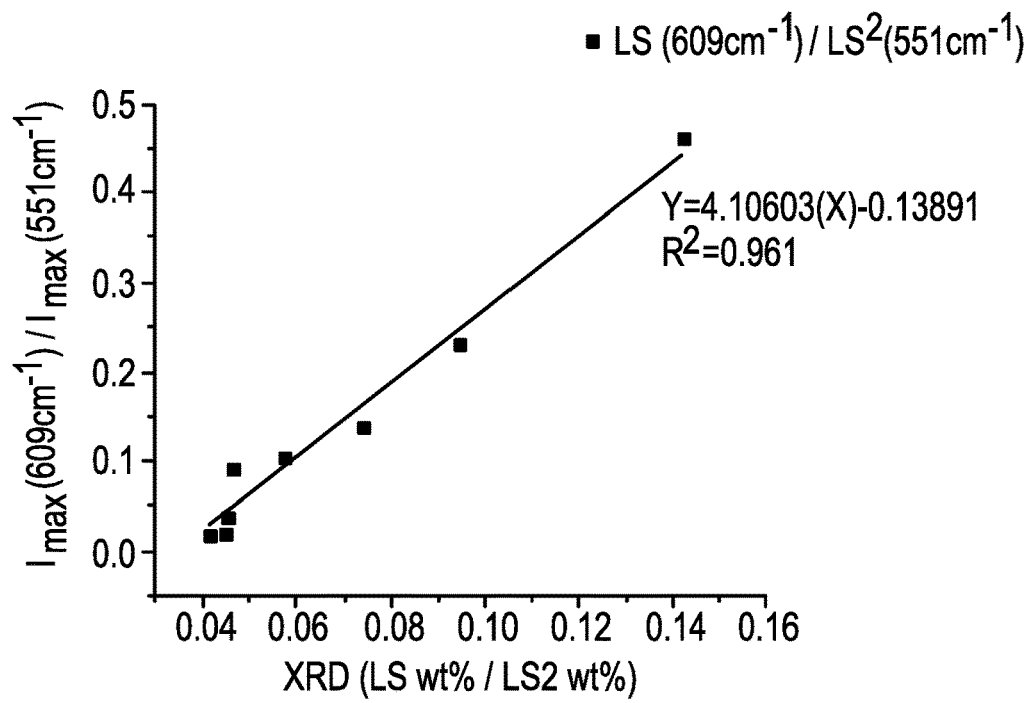
FIG. 5B depicts a calibration curve of an XRD spectral analysis using the peak intensity of a Raman spectral analysis peak, according to one or more embodiments shown or described herein.

FIGS. 5A and 5B depict examples of calibration curves of an XRD spectral analysis using a Raman peak intensity at 609 cm$^{-1}$ for lithium disilicate (LS2), at 490 cm$^{-1}$ for petalite, and at 551 cm$^{-1}$ for lithium metasilicate. From these calibration curves shown in FIGS. 5A and 5B, the XRD readings for specific crystal phases of a sample can be correlated to the Raman intensity peak readings from a Raman spectral analysis. When the Raman-XRD relationship is linear, the calibration curve itself may be used as a system equation, which allows for modelling of the Raman-XRD relationship for values which have not been measured via XRD.

Figure 6:
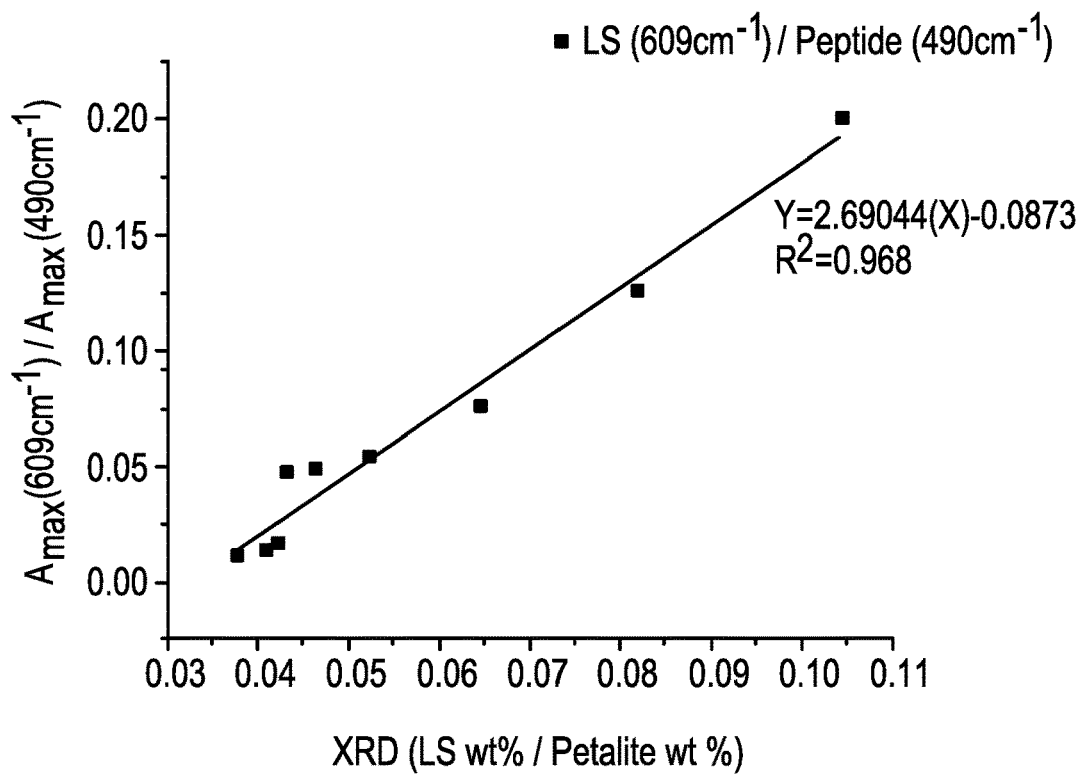
FIG. 6 depicts a calibration curve of an XRD spectral analysis using the peak intensity of a Raman spectral analysis peak, according to one or more embodiments shown or described herein.

FIG. 6 depicts an example of a calibration curve using a peak integrated area of the Raman spectral analysis for lithium metasilicate and petalite peaks, which are plotted over an XRD lithium metasilicate/petalite ratio. Similar to how the peak values of the XRD analysis can be used to correlate the Raman spectral analysis to the XRD readings, the area under the curve can also be used to model the Raman-XRD relationship. A system equation can also be derived from the relationship. Raman peaks can be quantified using calibration with the XRD spectral analysis for peak height and with peak area as shown on FIGS. 5A, 5B, and 6.

Figure 7A:
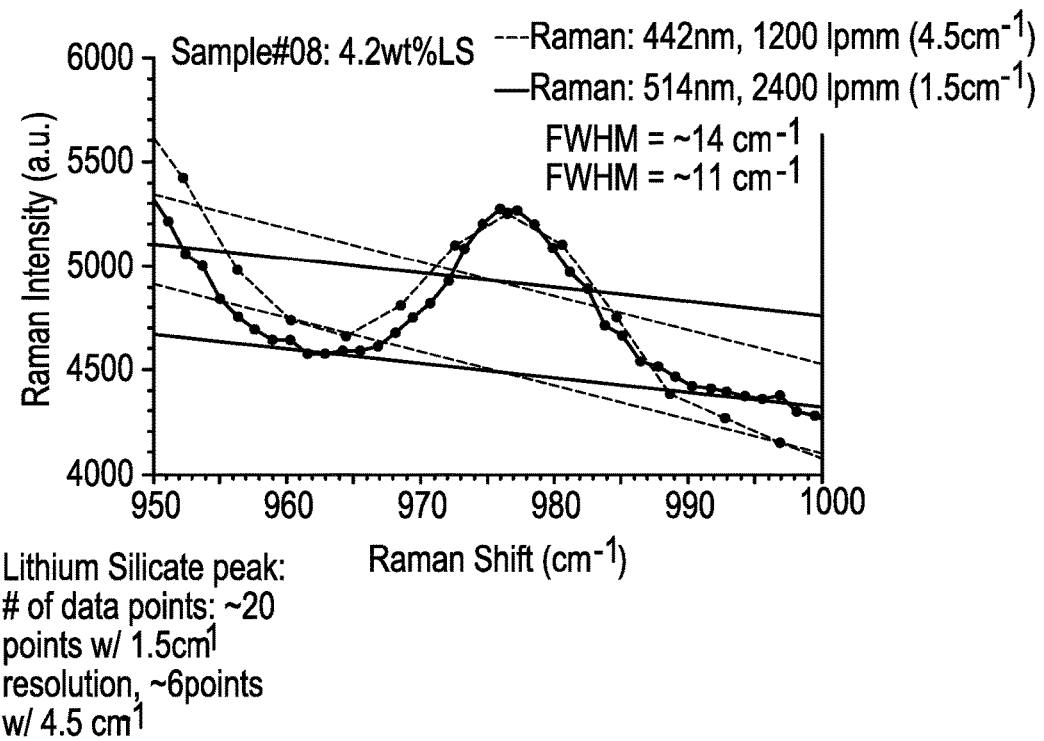
FIG. 7A depicts a Raman spectral analysis resolution for a glass ceramic sample, according to one or more embodiments shown or described herein.
Figure 7B:
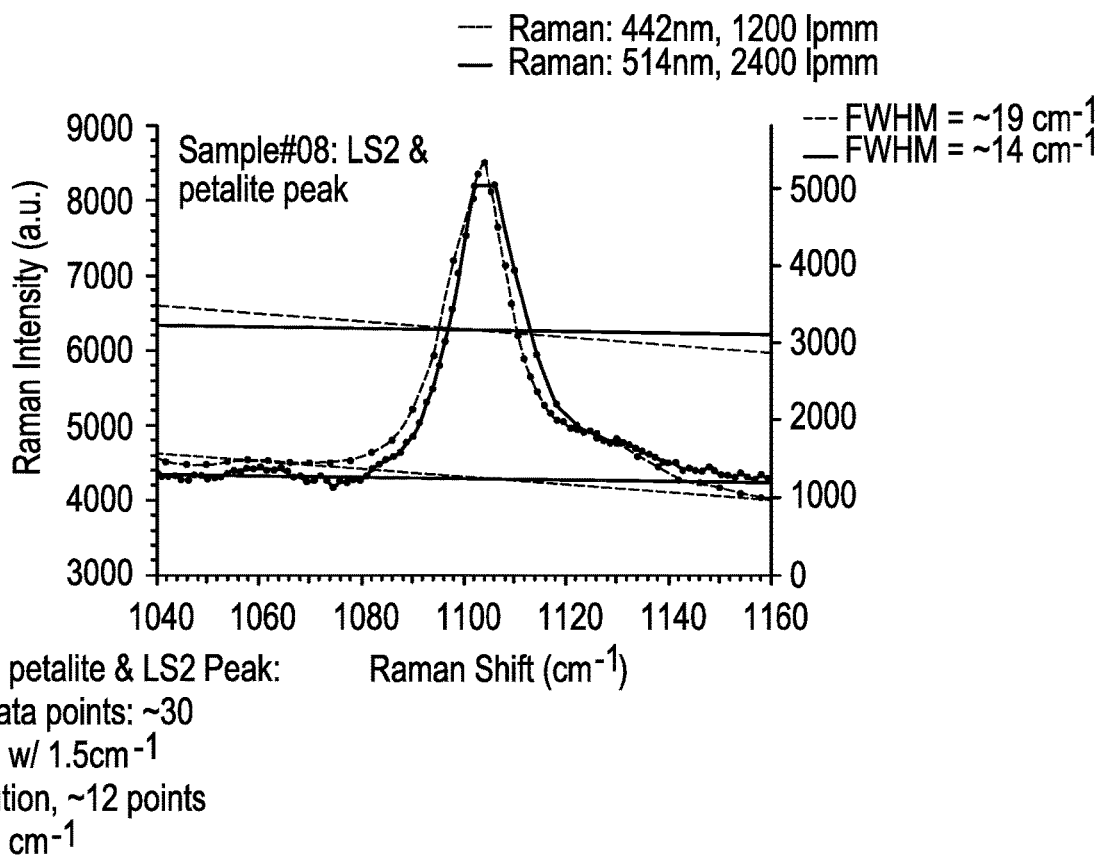
FIG. 7B depicts a Raman spectral analysis resolution for a glass ceramic sample, according to one or more embodiments shown or described herein.

FIGS. 7A and 7B depict an example of an impact of a Raman spectral analysis resolution for a sample containing lithium disilicate (33% total weight), petalite (45% total weight), lithium metasilicate (4.2% total weight), and glass (17% total weight) for 2 peaks used for quantification of crystal phases. From FIGS. 7A and 7B it can be seen how different resolutions can affect the model of the Raman spectral analysis. The difference in resolution is due to the use of different lasers having different wavelengths.

Instruments for Raman spectral analysis quality control may be selected to have spectral resolution and wavelengths suitable for detecting the narrow crystal peaks as shown in FIGS. 7A and 7B, without significantly more spectral resolution. High spectral resolution can significantly increase the cost and size of a Raman spectral analysis instrument, as well as increase the measurement time, which is undesirable for manufacturing quality control.

One method aiding the quality control of nucleated and cerammed glass ceramics includes analyzing the Raman spectral analysis peaks at predefined locations within the spectra. The peaks of interest are chosen to include both desirable and undesirable phases. After a baseline correction is preformed, peak height (intensity), peak width/full width at half maximum (FWHM), peak location (wavenumber), and area can all be used to quantify the presence of different crystal phases within a sample.

Known Raman standards can be analyzed to help deconvolve the peaks of interest. In the case where the spectral analysis is not deconvolved, the Raman spectral analysis is analyzed at each of the predefined locations by first applying a linear or broadly curved baseline between the superimposed peaks. This baseline is then subtracted from the Raman spectral intensity.

Peak fitting is performed around the wavenumber of the phases of interest as indicated in Table 1 below. A lorentzian peak having the functional form [a+b/(1+((x−c)/d)2)] is fit to each peak of interest. If the fit fails to fit a quality ($R^2$) less than 0.85 or the lorentzian width is greater than 150 wavenumbers, the peak is determined to be minimal or non-existent for the purposes of quality control. For all other fits, the peak height (intensity), peak width/full width at half maximum (FWHM), peak location (wavenumber), and area are used to quantify the phase presence after calibration with the XRD spectral analysis.

TABLE 1

| Cerammed Phases of Interest | |
|---|---|
| Cerammed phases of interest | |
| Type | Wavenumber |
| Desired | 489 |
| Desired | 551 |
| Undesired | 610 |
| Desired | 947 |
| Undesired | 975 |
| Desired | 1104 |

Figure 8:
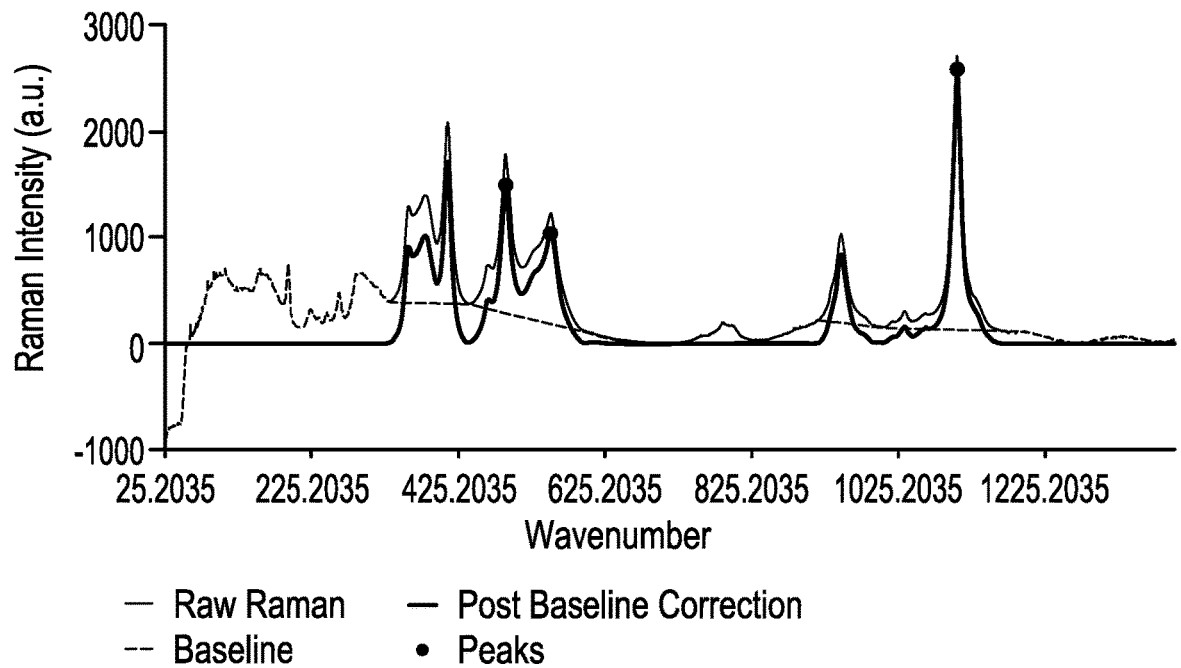
FIG. 8 depicts a Raman spectral analysis of a cerammed glass ceramic sample having minimal undesired phases, according to one or more embodiments shown or described herein.

FIG. 8 depicts an example Raman spectral analysis of a cerammed sample with minimal presence of undesired phases. The undesired phase at wavenumbers 610 (609.1286 in Table 2) and 975 (978.1063 in Table 2) are not detectable using the peak curve fitting method. FIG. 8 shows an example analysis where all undesired phases were not detectable using the above criteria. This, along with the adequate presence of the desired phases, indicates that the sample passes the quality control check. Table 2 below indicates some of the values obtained from an example quality control check which contained no undesired phases as defined in Table 1.

TABLE 2

| Example of a Raman Spectral Analysis of a Sample Having No Undesired Phases | |
|---|---:|
| Peak1 (Petalite) - Wavenumber | 489.4346 |
| Peak1 (Petalite) - Height | 14912.84 |
| Peak1 (Petalite) - FWHM | 15.39714 |
| Peak2 (LS2) - Wavenumber | 549.7935 |
| Peak2 (LS2) - Height | 10321.82 |
| Peak2 (LS2) - FWHM | 33.17464 |
| Peak3 (LS) - Wavenumber | 0 |
| Peak3 (LS) - Height | 0 |
| Peak3 (LS) - FWHM | 0 |
| Peak4 (Li3PO4) - Wavenumber | 946.1297 |
| Peak4 (Li3PO4) - Height | 8260.494 |
| Peak4 (Li3PO4) - FWHM | 16.85866 |
| Peak5 (LS) - Wavenumber | 0 |
| Peak5 (LS) - Height | 0 |
| Peak5 (LS) - FWHM | 0 |
| Peak6 (LS2 + Petalite) - Wavenumber | 1104.361 |
| Peak6 (LS2 + Petalite) - Height | 25850.73 |
| Peak6 (LS2 + Petalite) - FWHM | 11.83039 |

Figure 9:
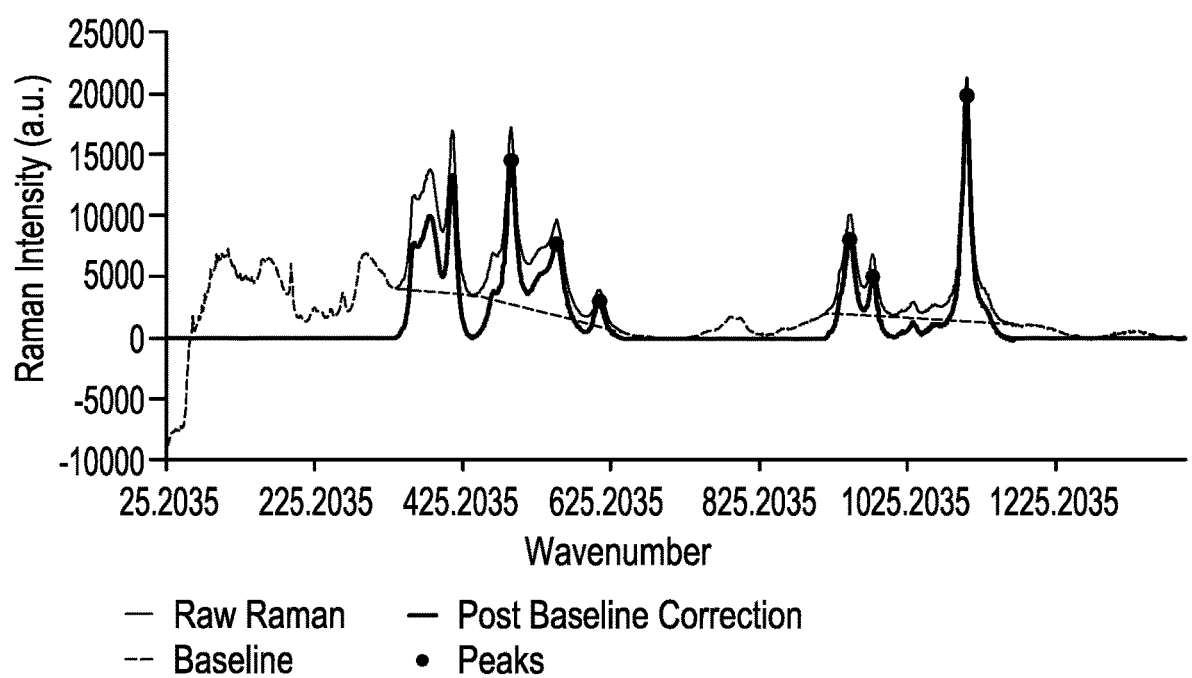
FIG. 9 depicts a Raman spectral analysis of a cerammed glass ceramic sample having undesired phases, according to one or more embodiments shown or described herein.

FIG. 9 depicts an example Raman spectral analysis of a cerammed sample with the presence of undesired phases. The undesired lithium metasilicate phases at wavenumbers 610 and 975 are detectable using the peak curve fitting method as disclosed above.

TABLE 3

Example of a Raman Spectral Analysis
of a Sample Having Undesired Phases

| | |
|---|---:|
| Peak1 (Petalite) - Wavenumber | 489.5242 |
| Peak1 (Petalite) - Height | 14502.55 |
| Peak1 (Petalite) - FWHM | 15.18282 |
| Peak2 (LS2) - Wavenumber | 550.1321 |
| Peak2 (LS2) - Height | 7681.15 |
| Peak2 (LS2) - FWHM | 35.83717 |
| Peak3 (LS) - Wavenumber | 609.1286 |
| Peak3 (LS) - Height | 3029.143 |
| Peak3 (LS) - FWHM | 19.08658 |
| Peak4 (Li3PO4) - Wavenumber | 946.5663 |
| Peak4 (Li3PO4) - Height | 8028.787 |
| Peak4 (Li3PO4) - FWHM | 17.10135 |
| Peak5 (LS) - Wavenumber | 978.1063 |
| Peak5 (LS) - Height | 4996.226 |
| Peak5 (LS) - FWHM | 10.77339 |
| Peak6 (LS2 + Petalite) - Wavenumber | 1105.013 |
| Peak6 (LS2 + Petalite) - Height | 19911.89 |
| Peak6 (LS2 + Petalite) - FWHM | 11.81467 |

Figure 10:
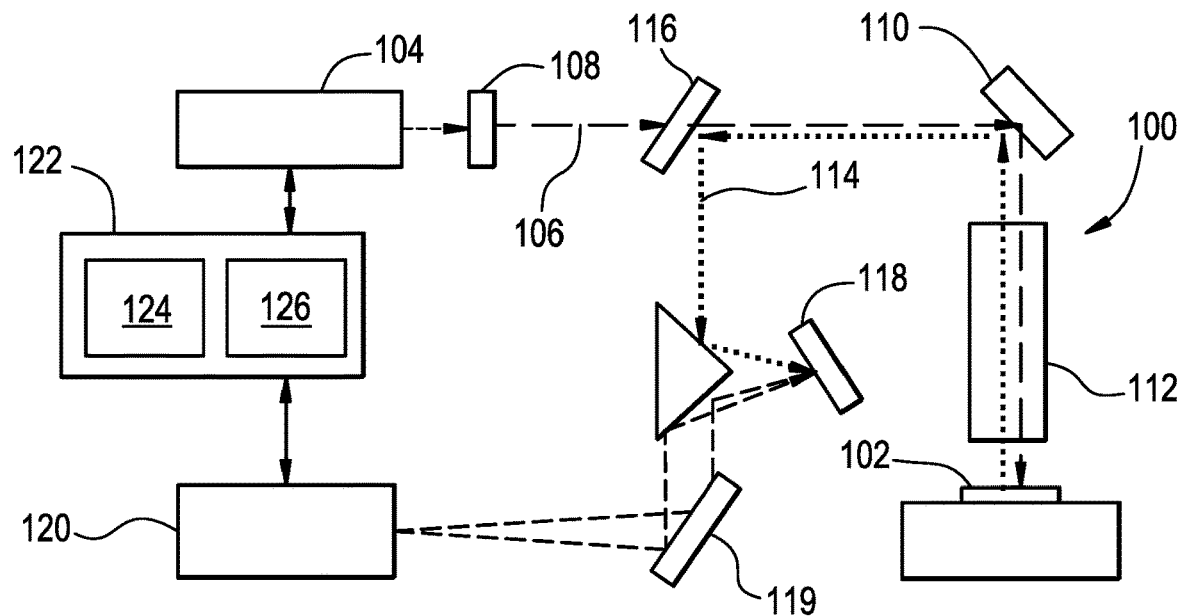
FIG. 10 schematically depicts a Raman spectroscopy apparatus, according to one or more embodiments shown or described herein.

FIG. 10 depicts a Raman spectroscopy system 100 used for determining the phases of a sample 102. An excitation source 104 emits a laser 106 passing through an optical element 108, such as a lens or beam expander. The laser 106 strikes a focusing mirror 110 and is passed through a focusing element 112, such as a microscope. The laser 106 then strikes the sample 102, exciting the sample 102. The sample 102 can be tested at multiple points to ensure a homogenous structure within the sample 102. As the particles within the sample 102 come down from the excited stage, they emit Raman light 114 that is reflected back though the focusing element 112 and focusing mirror 110. A Rayleigh filter 116 separates Rayleigh light from the Raman light 114. The Raman light 114 then strikes a grating 118, separating the light 114 into a spectrum 119, which then can be read by a detector 120. A control unit 122 having a processor 124 and memory unit 126 controls the excitation source 104 and detector 120, along with the various other components that make up the system 100.

Figure 11:
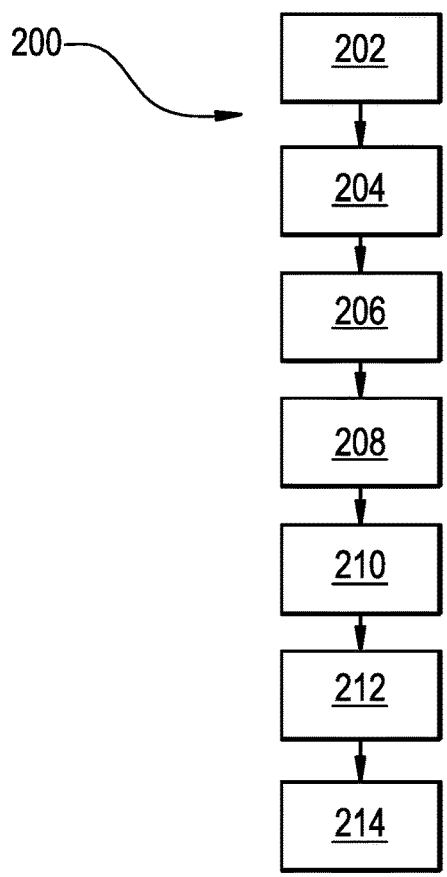
FIG. 11 depicts a flow chart of a crystal phase determination method, according to one or more embodiments shown or described herein.

FIG. 11 shows a flow chart for a method 200 for determining crystal phases of a glass ceramic sample. Step 202 includes applying energy to the sample using the excitation source. Step 204 includes detecting raw Raman spectral energy that is given off by the sample using a detector, wherein the raw Raman spectral energy includes peak values. Step 206 includes determining a plurality of predetermined energy peaks based off a composition of the sample. The plurality of predetermined energy peaks are calibrated using an x-ray diffraction method on a control sample. This way, the longer, more difficult process of XRD analysis only needs to be performed once to determine the wavenumber values of the sample corresponding to the Raman spectral energy. Step 208 includes superimposing the plurality of predetermined energy peaks over the raw Raman spectral energy. Step 210 includes applying a baseline value between each predetermined energy peak. Step 212 includes subtracting the baseline value from the raw Raman spectral energy. Step 214 includes calculating corrected peak values based on the raw Raman spectral energy and baseline value. Step 216 includes determining the crystal phases of the glass ceramic sample based on the corrected peak values.

It should now be understood that embodiments disclosed herein are directed to a method for determining crystal phases of a glass ceramic sample, including the steps of applying energy to the sample using an excitation source, detecting raw Raman spectral energy that is given off by the sample using a detector, wherein the raw Raman spectral energy includes peak attributes, determining a plurality of predetermined energy peaks based off a composition of the sample, superimposing the plurality of predetermined energy peaks over the raw Raman spectral energy, applying a baseline value between each predetermined energy peak, subtracting the baseline value from the raw Raman spectral energy, calculating corrected peak attributes based on the raw Raman spectral energy and baseline value, and determining the crystal phases of the glass ceramic sample based on the corrected peak attributes. Further, the method could include calibrating the plurality of predetermined energy peaks using an x-ray diffraction method on a control sample. The peak attributes may include height of a peak, full width at half maximum (FWHM) of a peak, and/or area of a peak.

It should now be understood that embodiments disclosed herein are directed to a method for crystal phase quality control of nucleated or partially cerammed glass sheet, the partially cerammed sheet having crystal phases that make it suitable for further processing in 3D forming or sheet bending.

It should now be understood that embodiments disclosed herein are directed to a method for crystal phase quality control of a 3D glass ceramic article that is cerammed while being 3D formed from either green glass or from a nucleated sheet.

It should now be understood that embodiments disclosed herein are directed to a method of evaluating glass ceramic/partially cerammed/nucleated articles based on Raman characterization in accordance with claim 1, including rejecting a sample if a ratio of a peak area for an undesirable phase and selected desirable phase(s) is calculated to be outside a plurality of acceptable limits, and rejecting the sample if relative amounts of each phase, determined based on calibration curve between XRD and Raman, are calculated to be outside a plurality of acceptable limits.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for determining crystal phases of a glass ceramic sample, comprising the steps of:
   applying an energy to the sample using an excitation source;
   detecting raw Raman spectral energy that is given off by the sample using a detector, wherein the raw Raman spectral energy includes peak attributes;
   determining a plurality of predetermined energy peaks based off a composition of the sample;
   superimposing the plurality of predetermined energy peaks over the raw Raman spectral energy;
   applying a baseline value between each predetermined energy peak;
   subtracting the baseline value from the raw Raman spectral energy;
   calculating corrected peak attributes based on the raw Raman spectral energy and baseline value; and
   determining the crystal phases of the glass ceramic sample based on the corrected peak attributes,
   wherein determining the crystal phases of the glass ceramic sample comprises determining the presence or absence of at least one of petalite, lithium metasilicate, lithium disilicate, lithium phosphate (Li$_3$PO$_4$), and combinations thereof.

2. The method as recited in claim 1, further comprising calibrating the plurality of predetermined energy peaks using an x-ray diffraction method on a control sample.

3. The method as recited in claim 1, wherein the peak attributes comprise height of a peak, full width at half maximum (FWHM) of a peak, and/or area of a peak.

4. A method of evaluating glass ceramic/partially cerammed/nucleated articles comprising:
   determining crystal phases of a glass ceramic sample according to the method recited in claim 1;
   rejecting a sample if a ratio of a peak area for an undesirable phase and selected desirable phase(s) is calculated to be outside a plurality of acceptable limits; and
   rejecting the sample if relative amounts of each phase, determined based on calibration curve between x-ray diffraction (XRD) and Raman, are calculated to be outside a plurality of acceptable limits.

* * * * *